(12) United States Patent
Koerber et al.

(10) Patent No.: US 6,594,771 B1
(45) Date of Patent: Jul. 15, 2003

(54) METHOD AND APPARATUS FOR MANAGING POWER IN AN ELECTRONIC DEVICE

(75) Inventors: Christine L. Koerber, Dallas, TX (US); Paul Henry Bouchier, Little Elm, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 09/548,464

(22) Filed: Apr. 13, 2000

(51) Int. Cl.[7] ................................................. G06F 1/13
(52) U.S. Cl. ........................ 713/330; 713/340; 714/22
(58) Field of Search ................................. 713/323, 324, 713/330, 340; 710/301, 302, 304; 714/2, 25, 24, 14, 22; 363/50, 65, 56

(56) References Cited

U.S. PATENT DOCUMENTS

| | | | | |
|---|---|---|---|---|
| 4,877,972 A | * | 10/1989 | Sobhani et al. ................ | 307/42 |
| 5,229,926 A | * | 7/1993 | Donaldson et al. ........... | 363/65 |
| 5,535,401 A | * | 7/1996 | Rawson, III et al. ........ | 713/300 |
| 5,652,893 A | * | 7/1997 | Ben-Meir et al. ............ | 713/300 |
| 5,842,027 A | * | 11/1998 | Oprescu et al. ............. | 713/300 |
| 5,842,030 A | * | 11/1998 | Larabell et al. ............. | 713/340 |
| 5,905,645 A | * | 5/1999 | Cross .......................... | 363/65 |
| 6,101,611 A | * | 8/2000 | Yoshida ....................... | 713/340 |
| 6,148,408 A | * | 11/2000 | Shimoda ...................... | 713/320 |
| 6,260,151 B1 | * | 7/2001 | Omizo et al. ................ | 713/324 |
| 6,289,399 B1 | * | 9/2001 | Furuichi et al. ................ | 710/6 |
| 6,289,467 B1 | * | 9/2001 | Lewis et al. ................. | 713/340 |
| 6,292,902 B1 | * | 9/2001 | Drobnik ....................... | 713/320 |
| 6,301,674 B1 | * | 10/2001 | Saito et al. .................. | 713/340 |
| 6,308,240 B1 | * | 10/2001 | De Nicolo ................... | 710/300 |
| 6,321,341 B1 | * | 11/2001 | Kamijo et al. .............. | 713/340 |

* cited by examiner

Primary Examiner—Paul R. Myers
Assistant Examiner—Raymond N Phan

(57) ABSTRACT

A method of managing power in an electronic device having at least one connectable component includes determining a total power requirement for the at least one connectable component. The available power level for a power supply connected to the electronic device is determined. The total power requirement is compared with the available power level. The at least one connectable component may draw power from the power supply if the total power requirement is not greater than the available power level.

21 Claims, 4 Drawing Sheets

METHOD AND APPARATUS FOR MANAGING POWER IN AN ELECTRONIC DEVICE

FIELD OF THE INVENTION

This invention relates to power management for electronic devices with hot-swappable components and more specifically to a system for providing power to components newly added to the device only if the device has sufficient power for all previously powered components as well as the newly added components.

REFERENCE TO MICROFICHE APPENDIX

This application is submitted with a microfiche appendix consisting of 1 microfiche transparency with a total of 19 frames.

BACKGROUND

Computers and related electronic devices have become widely used, and their continuous and error-free operation is vital in many applications. The increased use of complex electronic systems with multiple electronic components has resulted in a need to reduce the space occupied by the electronic components and to simplify their mounting assemblies. Electronic components are therefore often mounted in a rack or cabinet. The electronic components, such as printed circuit boards, may either be mounted directly in the rack, or may be placed in chassis which are mounted in the rack. The use of racks or cabinets for large complex electronic systems having multiple electronic components has the advantage of simplifying assembly and maintenance of the equipment, and reducing the space occupied by the systems.

Multiple linked racks are often used in large multiprocessor computer systems. For example, a typical system may have eight linked racks, each with eight microprocessor clusters, operating together as one computer system and running a single operating system. This type of computer system may be used in banks, Internet stores, flight managements systems, etc, where the constant availability of the computer system is critical. In these types of applications, a rack mounted computer system may be required to operate with 99.999% uptime, meaning that the system must be operative for all but about five minutes each year. If a single electronic component in a rack fails, causing the rack to fail, all the linked racks are likely to fail. Therefore, in such a rack mounted computer system with many linked electronic components, the power capacity and power requirements of the system must be carefully monitored and managed.

Data transfer between rack mounted electronic components is simplified by placing a backbone in the rack. The backplane is a wiring board containing electrical conductors such as a data bus, address bus, custom electrical signals as needed by the electronic components, and power lines. The electronic components are connected to the backplane as they are mounted in the rack. The electronic components can then exchange information through the electrical conductors on the backplane.

The use of a rack for large complex electronic systems can also simplify the electronic components, since power is typically supplied by the rack rather than by individual power supplies on each electronic component. This also simplifies cooling of the electronic components, since the main power supplies, which produce a great deal of heat, may be grouped in one location and isolated from the electronic components. The electronic components may then use simpler power supplies or regulators. However, this requires that the power supply capacity of the rack be carefully managed to ensure that each electronic component has enough power. If the rack is underpowered and all the electronic components attempt to draw power from the rack, none of the electronic components will operate correctly.

A conservative solution is to include power supplies that can provide as much power as the rack might ever need. To calculate the power needed in this solution, the maximum power requirements of the most power hungry electronic components are determined, multiplied by the number of slots for electronic component in the rack. However, some of the electronic component slots may remain unused in many applications, and electronic components vary greatly in their power requirements. This conservative solution thus will almost always have unused power capacity and is heavy and costly. On the other hand, newly developed electronic components for the rack may require even more power than the previous components, so the operator of the electronic system still needs to keep track of the power capacity and requirements for the system to add power capacity as needed.

Another typical solution is to include power supplies that can provide as much power as the rack might need under the most common configuration. This reduces the cost of the power system and minimizes unused power capacity. However, this increases the burden on the operator of the electronic system to keep track of the power capacity and requirements for the system. Each time the electronic components in the rack are changed, the operator will need to calculate the power requirements and change power supplies as needed.

Power management in a rack for large complex electronic systems is further complicated by the need to keep the electronic components powered and operating, even when a electronic component is removed or a new electronic component is added to the system. For example, if five electronic components are powered and operating in the rack, adding a sixth electronic component must not cause the five existing components to fail. These types of electronic components that may added to or removed from the system during operation are referred to as "hot-swappable" electronic components.

Consequently, a need exists for a power management system for electronic devices having multiple electronic components. A further need exists for a system to manage power for hot-swappable electronic components. A still further need exists for a system to manage power from hot-swappable power supply modules. A still further need exists for a power management system for an electronic device to automatically calculate power requirements in the device. A still further need exists for a system to provide power to newly added components in an electronic device only when preexisting components in the device will not be deprived of power. A still further need exists for a power management system for an electronic device to alert an operator of the system if the electronic device has insufficient electrical power to meet the needs of all the electronic components in the device.

SUMMARY

To assist in achieving the aforementioned needs, the inventors have devised a power management system for an electronic device having hot-swappable components and redundant hot-swappable power supplies. Each component reports its power requirement to a power monitor in the device. The power monitor reads the power capacity and status from the power supplies to determine the total power capacity for the device. If the electronic device has sufficient power capacity to supply the installed components, the power monitor allows the components to draw power from the device. If the electronic device does not have sufficient power capacity to supply the installed components, the power monitor alerts the operator of the device of the problem.

As hot-swappable components are added to the device, the power monitor receives the reports with their power requirements and calculates whether the device has sufficient power for them along with the already powered components. If the device has sufficient power, the power monitor signals the newly added components that they may draw power from the device. If the device does not have sufficient power, the power monitor does not signal the components to draw power, leaving them unpowered, and the power monitor alerts the operator of the device of the problem.

The invention may comprise a method of managing power in an electronic device having at least one connectable component. The method includes determining a total power requirement for the at least one connectable component. The available power level for a power supply connected to the electronic device is determined. The total power requirement is compared with the available power level. The at least one connectable component may draw power from the power supply if the total power requirement is not greater than the available power level.

The invention may also comprise an apparatus for managing power in an electronic device. The apparatus comprises one or more computer readable storage media, and computer readable program code stored in the one or more computer readable storage media. The computer readable code comprises code for reading at least one power requirement from each of at least one electronic component operatively associated with the electronic device. The computer readable code also comprises code for summing said at least one power requirement from the at least one electronic component to calculate a total power requirement for the at least one electronic component. The computer readable code also comprises code for comparing the total power requirement with an available power level from at least one power supply, the at least one power supply being operatively associated with the electronic device. The computer readable code also comprises code for enabling the at least one electronic component to draw power from the at least one power supply if the total power requirement is not greater than the available power level.

The invention may also comprise a power management system for an electronic device. The power management system comprises at least one power supply having an available power capacity, and a power monitor comprising at least one first receiver, at least one first transmitter having at least a first operative state and a second operative state, and at least one electronic component associated with the electronic device. The at least one electronic component is electrically connected to the at least one power supply and has a power requirement. The at least one electronic component comprises at least one second transmitter electrically connected to the at least one power monitor first receiver, and at least one second receiver electrically connected to the at least one power monitor first transmitter. The power management system has at least two operating states.

In the first operating state the at least one electronic component draws power from the at least one power supply. The at least one power monitor first receiver has received the power requirement from the at least one second transmitter in the at least one electronic component, and a sum of the power requirement is not greater than a sum of the at least one power supply available power capacity. The at least one first transmitter in the at least one power monitor is in the first operative state.

In the second operating state, the at least one electronic component does not draw power from the at least one power supply. The at least one power monitor first receiver has received the power requirement from the at least one second transmitter in the at least one electronic component, and the sum of the power requirement is greater than the sum of the at least one power supply available power capacity. The at least one first transmitter in the at least one power monitor is in the second operative state.

The invention may also comprise an electronic apparatus with at least one power supply having a power capacity. A plurality of hot-swappable electronic components are electrically connected to the at least one power supply. The electronic apparatus includes means for enabling a maximum number of the plurality of hot-swappable components to draw power from the power supply without exceeding the power capacity of the at least one power supply.

BRIEF DESCRIPTION OF THE DRAWING

Illustrative and presently preferred embodiments of the invention are shown in the accompanying drawing, in which.

DESCRIPTION OF THE PREFERRED EMBODIMENT

Figure 1:
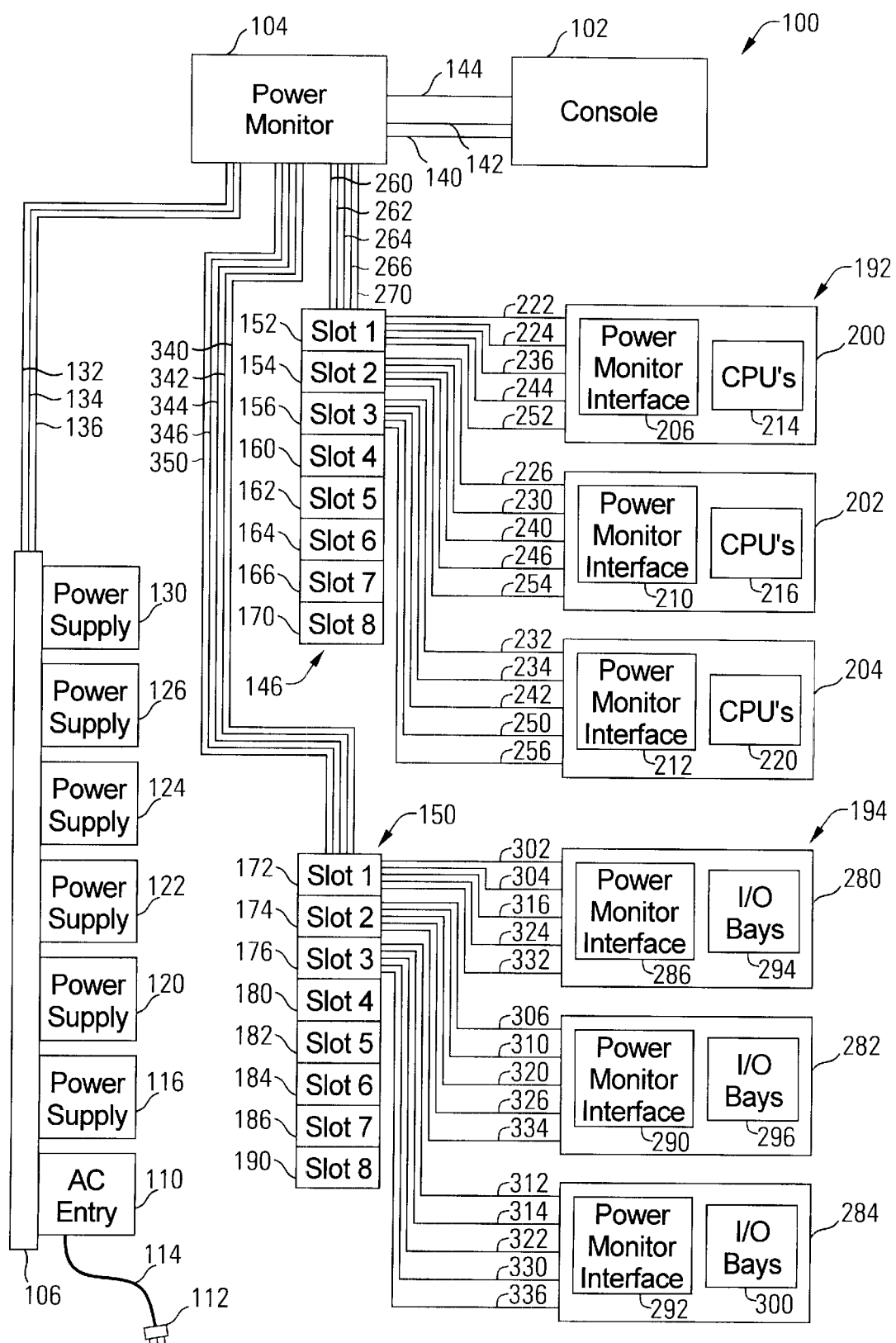
FIG. 1 is a block diagram of an exemplary device with hot-swappable components employing a power management system.

The drawing and description, in general, disclose a method of managing power in an electronic device 100 having at least one connectable component (e.g., 192 and 194). The method includes determining a total power requirement for the at least one connectable component 192 and 194. The available power level for a power supply 106 connected to the electronic device is determined. The total power requirement is compared with the available power level. The at least one connectable component 192 and 194 may draw power from the power supply 106 if the total power requirement is not greater than the available power level.

The drawing and description also disclose an apparatus for managing power in an electronic device 100. The apparatus comprises one or more computer readable storage media, and computer readable program code stored in the one or more computer readable storage media. The computer readable code comprises code for reading at least one power requirement from each of at least one electronic component (e.g., 200) operatively associated with the electronic device 100. The computer readable code also comprises code for summing said at least one power requirement from the at least one electronic component (e.g., 200) to calculate a total power requirement for the at least one electronic component (e.g., 200). The computer readable code also comprises code for comparing the total power requirement with an available power level from at least one power supply (e.g., 130), the at least one power supply (e.g., 130) being operatively associated with the electronic device 100. The computer readable code also comprises code for enabling the at least one electronic component (e.g., 200) to draw power from the at least one power supply (e.g., 130) if the total power requirement is not greater than the available power level.

The drawing and description also disclose a power management system for an electronic device 100. The power management system comprises at least one power supply 106 having an available power capacity, and a power monitor 104 comprising at least one first receiver (e.g., 252), at least one first transmitter (e.g., 236) having at least a first operative state and a second operative state, and at least one electronic component (e.g., 200) associated with the electronic device 100. The at least one electronic component 200 is electrically connected to the at least one power supply 106 and has a power requirement. The at least one electronic component 200 comprises at least one second transmitter (e.g., 252) electrically connected to the at least one power monitor first receiver 252, and at least one second receiver (e.g., 236) electrically connected to the at least one power monitor first transmitter 236. The power management system has at least two operating states.

In the first operating state the at least one electronic component 200 draws power from the at least one power supply 106. The at least one power monitor first receiver 252 has received the power requirement from the at least one second transmitter in the at least one electronic component 200, and a sum of the power requirement is not greater than a sum of the at least one power supply available power capacity. The at least one first transmitter 236 in the at least one power monitor is in the first operative state.

In the second operating state, the at least one electronic component 200 does not draw power from the at least one power supply 106. The at least one power monitor first receiver 252 has received the power requirement from the at least one second transmitter in the at least one electronic component 200, and the sum of the power requirement is greater than the sum of the at least one power supply available power capacity. The at least one first transmitter 236 in the at least one power monitor is in the second operative state.

The drawing and description also disclose an electronic apparatus 100 with at least one power supply 106 having a power capacity. A plurality of hot-swappable electronic components 192 and 194 are electrically connected to the at least one power supply 106. The electronic apparatus 100 includes means 104 for enabling a maximum number of the plurality of hot-swappable components 192 and 194 to draw power from the power supply 106 without exceeding the power capacity of the at least one power supply 106.

A power management system for electronic devices with hot-swappable electronic components and redundant hot-swappable power supplies allows electronic components to be added or removed during operation without disturbing the rest of the components in the device. For example, computer processor boards and input/output (I/O) bays may be plugged into a rack or cabinet while the rack is powered, without disturbing other components already installed in the rack. The electronic components connect to the device but do not draw power from power supplies in the device until enabled by a power monitor. Thus, if the electronic components in the device are using all the available power in the device, and an additional electronic component is added to the device, the power monitor will not enable it to draw power. Otherwise, the power supplies in the device would be unable to provide sufficient power to all the electronic components and the voltage in the device would drop, causing all the electronic components to fail.

The power monitor reads the power capacity and status of each power supply module in the system to determine the total available power. As electronic components are added to the device, the power monitor receives their power requirements and determines whether the power requirements exceed the total available power. If there is sufficient power, the power monitor enables the newly added components to draw power from the power supplies in the device. If there is not sufficient power, the power monitor leaves the newly added components unpowered and alerts the device operator of the power fault.

The power management system greatly increases availability of the electronic device. For example, the redundant hot-swappable power supplies and power monitor control of electronic component power use enable an electronic device with multiple cabinets to remain operational for 99.999% of the time. Each cabinet may have its own power block containing multiple hot-swappable power supplies and its own power monitor, with one operating system running on the entire electronic device. Redundant power supplies ensure that the failure of a power supply will not cause the system to crash due to power failures. Power monitor control of electronic device power use ensures that adding new electronic devices during operation will also not cause the system to crash due to power failures.

The power management system also greatly increases the reliability and availability of the electronic device by preventing power failures. The power management system also greatly simplifies operation and maintenance of the electronic device, by allowing electronic components to be added or removed from the device without power concerns. The device operator does not need to manually track power requirements for the various electronic components in the device and power capacity from the power supplies, simplifying operation and reducing the likelihood of operator error.

Referring now to FIG. 1, an exemplary electronic device 100 utilizing the power management system will be described. A console 102 provides an operator interface to the electronic device. The console 102 is a computer on one printed circuit board, having at least one central processing unit(CPU) and a memory, and running an operating system such as the VxWorks® real-time operating system available from Wind River Systems, Inc. of Alameda, Calif. The console 102 allows local and remote access to the device 100, coordinates messages between electronic devices (e.g., 192 and 194) in the device 100, controls the front panel display, and performs other typical system management functions.

A power monitor 104 in the electronic device 100 monitors the power requirements and capacity of the device 100. The power monitor 104 is based on an Intel® 83930 microcontroller, available from the Intel Corporation of Santa Clara, Calif. The power monitor 104 is controlled by firmware, a computer program stored in a read-only memory (ROM). The ROM is preferably an electrically erasable programmable ROM (EEPROM) or similar device which may be updated with new firmware during operation. The microcontroller and firmware in the power monitor 104 may also perform other monitoring tasks in the electronic device 100, such as monitoring temperature and switches on the front panel of the electronic device 100. Power use in the electronic device 100 is also enabled by the power monitor 104, as will be described in detail hereinafter.

Power for the electronic device 100 is supplied by a power block 106. Power enters the power block 106 through an AC entry circuit 110, which plugs into a power outlet through an electrical plug 112 and cord 114. A group of power supplies 116, 120, 122, 124, 126, and 130 are connected to the power block 106 to convert the alternating current (AC) power into regulated 48 v (volt) direct current (DC) and 5 v DC power. Any number of power supplies (e.g., 116) from one to eight can be connected to the power block 106, according to the power requirements of the electronic device 100. The 48 v DC and 5 v DC power are carried to the power monitor 104 on electrical conductors 132 and 134, respectively. The power supplies (e.g., 116) also have undervoltage monitor circuits to turn themselves off in the event of a fault. When a power supply (e.g., 116) has a fault, the power monitor 106 removes the power capacity of the power supply (e.g., 116) from the total power capacity of the electronic device 100. The power monitor 106 also refuses further on-line addition of electronic components (e.g., 192 and 194), and sends an indication of the fault to the console 102.

The power supplies 116, 120, 122, 124, 126, and 130 each include an identification register and a status register which may be accessed by the power monitor 104 across an electrical conductor 136 connected between the power monitor 104 and the power block 106. The identification register allows the power monitor 104 to detect the presence and type of a power supply (e.g., 130). The power monitor 104 can thus determine the total power available from the power block 106 by detecting the number and types of power supplies (e.g., 130) in the electronic device 100. The status register allows the power monitor 104 to detect when a power supply (e.g., 130) is failing and remove it from the tally of available power in the electronic device 100.

Power is supplied to the console 102 over electrical conductors 140 and 142 from the power monitor 104, which carry 48 v DC and 5 v DC power. A regulator (not shown) on the console 102 may convert these power levels into others needed by the circuitry in the console 102. The console 102 communicates with the power monitor 104 over a group of electrical conductors 144 using a Universal Serial Bus (USB) protocol, a serial bus developed by a consortium of computer companies. The Universal Serial Bus is used throughout the electronic device 100, but must first be initialized or enumerated by the console 102.

Electronic components (e.g., 192 and 194) are connected to the electronic device 100 through a processor backplane 146 and an input/output (I/O) backplane 150. The backplanes 146 and 150 are printed wiring boards providing connections between components (e.g., 192 and 194) which plug into the backplanes 146 and 150 at right angles. Each backplane 146 and 150 has eight slots 152–170 and 172–190, respectively. Up to eight processor modules 192 can connect to the eight slots 152–170 of the processor backplane 146, and up to eight I/O bays 194 can connect to the eight slots 172–190 of the I/O backplane 150. The electronic components 192 and 194 are hot-swappable, that is, they may be added to or removed from the backplanes 146 and 150 when the power is turned on in the electronic device 100.

In the exemplary electronic device 100 illustrated in FIG. 1, three processor modules 200, 202, and 204 are connected to slots 1 (152), 2 (154), and 3 (156) in the processor backplane 146, respectively. Each processor module 200, 202, and 204 contains a power monitor interface 206, 210, and 212 and a CPU block 214, 216, and 220, respectively. The CPU blocks 214, 216, and 220 contain one or more microprocessors, memory, and other associated circuitry allowing them to execute software executions, such as running an operating system and other applications. The power monitor interfaces 206, 210, and 212 contain a microcontroller and a ROM containing firmware and the power requirements for the processor module 200, 202, or 204.

The processor modules 200, 202, and 204 are connected to the processor backplane 146 by a group of electrical conductors. Each processor module 200, 202, and 204 receives 48 v DC and 5 v DC power across a pair of electrical conductors 222 and 224, 226 and 230, and 232 and 234, respectively. The power monitor interfaces 206, 210, and 212 use the 5 v DC to operate whenever the electronic device 100 is powered. The CPU blocks 214, 216, and 220 use the 48 v DC to operate only when a power enable signal is received from the power monitor 104 over an electrical conductor 236, 240, and 242, respectively. The power monitor 104 detects the presence of the processor modules 200, 202, and 204 in the processor backplane 146 by monitoring the state of a signal on a present electrical conductor 244, 246, and 250, respectively. The present electrical conductors 244, 246, and 250 may signal the presence of the electronic components 192 by placing a voltage on the electrical conductors 244, 246, and 250, such as through the use of a pullup resistor. Alternatively, the present signal may be any other electrical signal that allows the power monitor to detect the presence of the electronic components 192 in the rack.

When the power monitor 104 has detected the presence of a processor module 200, 202, or 204 over the present electrical conductor 244, 246, or 250, the power monitor 104 requests the power requirements for the processor module 200, 202, or 204 over the USB bus on electrical conductor groups 252, 254, and 256, respectively. The microcontrollers in the power monitor interfaces 206, 210, and 212 read the power requirements for the processor modules 200, 202, or 204 and report the requirements to the power monitor 104 over the USB bus on electrical conductor groups 252, 254, and 256. If the electronic device 100 has sufficient power for the processor modules 200, 202, or 204, the power monitor 104 asserts the power enable signal over the electrical conductors 236, 240, and 242. For the purposes of this description, the term assert means that the voltage on the electrical conductor is set at a level that indicates a certain condition. For example, asserting the power enable signal means that the voltage on the electrical conductor (e.g., 236) is set at a level indicating that the electrical component (e.g., 200) may draw power from the electronic device 100.

Other electrical connections between the processor modules 200, 202, and 204 and the processor backplane 146 are included as needed. For example, an Inter Integrated Circuit ($I^2C$) bus, developed by Philips Semiconductors of the Netherlands, may be used to transfer information to and from the CPU blocks 214, 216, and 220. The $I^2C$ bus is a bi-directional serial bus requiring two electrical conductors, one for data and one for a clock signal.

The processor backplane 146 is connected to the power monitor 104 through electrical conductors 260, 262, 264, 266, and 270, carrying a USB bus, present signals, power enable signals, 48 v DC and 5 v DC, respectively. Alternatively, the 48 v DC and 5 v DC power may be provided on electrical conductors in the cabinet which do not run through the power monitor 106. Other electrical connections between the processor backplane 146 and the power monitor 104 are included as needed by the electronic device 100.

In the exemplary electronic device 100 illustrated in FIG. 1, three I/O bays 280, 282, and 284 are connected to slots 1 (172), 2 (174), and 3 (176) in the I/O backplane 150, respectively. Each I/O bay 280, 282, and 284 contains a power monitor interface 286, 290, and 292 and an I/O block 294, 296, and 300, respectively. The I/O blocks 294, 296, and 300 I/O resources such as peripheral component interconnect (PCI) slots. The power monitor interfaces 286, 290, and 292 contain a ROM containing the power requirements for the I/O bays 280, 282, and 284.

The I/O bays 280, 282, and 284 are connected to the I/O backplane 150 by a group of electrical conductors. Each I/O bay 280, 282, and 284 receives 48 v DC and 5 v DC power across a pair of electrical conductors 302 and 304, 306 and 310, and 312 and 314, respectively. The power monitor interfaces 286, 290, and 292 use the 5 v DC to operate whenever the electronic device 100 is powered. The I/O blocks 294, 296, and 300 use the 48 v DC to operate only when a power enable signal is received from the power monitor 104 over an electrical conductor 316, 320, and 322, respectively. The power monitor 104 detects the presence of the I/O bays 280, 282, and 284 in the I/O backplane 150 by monitoring the state of a signal on a present electrical conductor 324, 326, and 330, respectively. When the power monitor 104 has detected the presence of an I/O bay 280, 282, or 284 over the present electrical conductor 324, 326, or 330, the power monitor 104 requests the power requirements for the I/O bay 280, 282, or 284 over the USB bus on electrical conductor groups 332, 334, and 336, respectively. A microcontroller in the I/O backplane 150 reads the power requirements for the I/O bay 280, 282, or 284 from the ROM in the power monitor interface 286, 290, or 292 over the USB bus on electrical conductor groups 332, 334, or 336 and reports the requirements to the power monitor 104. If the electronic device 100 has sufficient power for the I/O bays 280, 282, and 284, the power monitor 104 asserts the power enable signal over the electrical conductors 316, 320, and 322.

Other electrical connections between the I/O bays 280, 282, and 284 and the I/O backplane 150 are included as needed. For example, I²C bus may be used to transfer information to and from the I/O blocks 294, 296, and 300. An I²C bus may also be used between the processor backplane 146 and the I/O backplane 150 to transfer information between the CPU blocks 214, 216, and 220 and the I/O blocks 294, 296, and 300.

The I/O backplane 150 is connected to the power monitor 104 through electrical conductors 340, 342, 344, 346, and 350, carrying a USB bus, present signals, power enable signals, 48 v DC and 5 v DC, respectively. Other electrical connections between the I/O backplane 150 and the power monitor 104 are included as needed by the electronic device 100.

The electronic device 100 also includes a breaker which turns on 48 v DC and 5 v DC from the power block 106. The 5 v DC powers the power monitor and other management circuitry in the electronic device 100 whenever the breaker is closed. However, the 48 v DC is also switched through a power switch on the electronic device 100. Thus, 48 v DC is only turned on in the electronic device 100 when both the breaker and the power switch are closed. The power switch in the preferred embodiment is partially under control of the firmware in the power monitor 106. The power monitor monitors the state of the power switch, and when the power switch is turned on, the power monitor turns the 48 v DC on according to conditions to be described hereinafter. However, turning the power switch off directly turns off the 48 v DC power without the intervention or control of the power monitor firmware.

The electronic components (e.g., 192 and 194) in the electronic device 100 only use 48 v DC power when the power monitor 104 asserts the power enable signals on the power enable electrical conductors 236, 240, 242, 316, 320, and 322, as will be discussed in more detail hereinafter.

Figure 2:
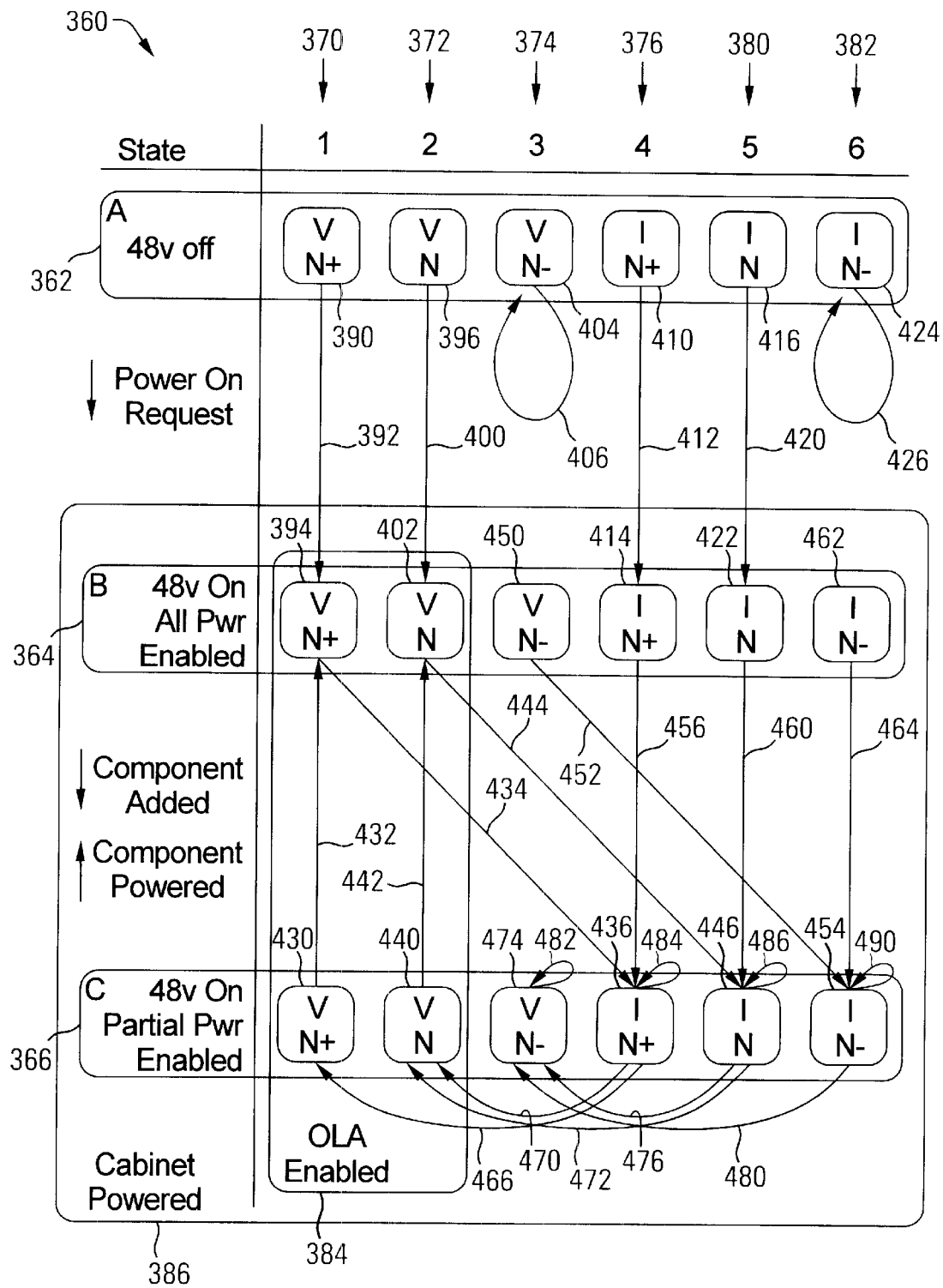
FIG. 2 is a state machine diagram for the power management system of FIG. 1.

Referring now to FIG. 2, the firmware controlling the power monitor 104 in the exemplary electronic device 100 of FIG. 1 will be described. The firmware in the electronic device 100 controls the power usage of electronic components 192 and 194 according to 18 states in a state diagram 360, including three major states 362, 264, and 366 each divided into six substates 370–382. The firmware is written in the C programming language and is stored primarily in a ROM on the power monitor 104. The relevant portions of the firmware source code are included in the Microfiche Appendix. The firmware may alternatively be written in any computer programming language suitable for monitoring and controlling the power related hardware in the electronic device 100.

The terms appearing in the state diagram 360 are defined as follows:

V Power tally valid, all power requirements known (where the power tally is the difference between the total power capacity of the power block 106 and the total power required by all electronic components 192 and 194 connected to the electronic device 100)

I Power tally invalid, at least one power requirement is unknown

N+ Power redundancy state is N+, the power tally is greater than or equal to the power capacity of one power supply (e.g., 130) in the power block 106

N Power redundancy state is N, the power tally is less than the power capacity of one power supply (e.g., 130) in the power block 106 but greater than zero N− Power redundancy state is N−, the power tally is less than zero The state diagram 360 for the firmware in the electronic device 100 is divided into three major system power states. In the first state, state A 362, 48 v DC power is turned off in the electronic device 100. In the second state, state B 364, 48 v DC power is turned on and all electronic components 192 and 194 are enabled to draw 48 v DC power from the power block 106. In the third state, state C 366, 48 v DC power is turned on but at least one electronic component (e.g., 192 and 194) is not enabled to draw 48 v DC power from the power block 106.

Within each major state 362, 364, and 366 there are six substates 370–382 which reflect the validity and redundancy level of the power tally. The power tally is valid when the power monitor 104 has received the power requirements from all electronic components 192 and 194 in the electronic device 100. The power tally is valid in substate 1 370, substate 2 372, and substate 3 374. The power tally is invalid when the power monitor 104 has not received the power requirements from at least one electronic component (e.g., 200) which has indicated its presence in the electronic device 100 across a present line 244. The power tally is invalid in substate 4 376, substate 5 380, and substate 6 382.

The three redundancy levels of the power tally, N+, N, and N−, indicate how much power is available in the system, taking into account the needs of the electronic components 192 and 194. In redundancy level N+, the power tally is greater than or equal to the power of one power supply (e.g., 130). For example, if the power supplies 116–130 each supply 600 watts, and six power supplies 116–130 are connected to the electronic device 100, the total available power is 3600 watts. If the electronic components 192 and 194 attached to the electronic device 100 require a combined total of 2900 watts, the power tally equals 3600 watts minus 2900 watts, or 700 watts. The power tally, 700 watts, is greater than the power of one power supply (e.g., 130), 600 watts. Therefore, the power tally is at redundancy level N+. This indicates that even if a power supply (e.g., 130) were removed from the power block 106, or if a power supply failed, the electronic device 100 would have sufficient power for all the electronic components 192 and 194 in the electronic device 100. Thus, if the power tally is at redundancy level N+, the power monitor 104 will enable power to the electronic component (e.g., 200). The power tally is at redundancy level N+ in substates 1 370 and 4 376.

Note that the power tally is calculated as soon as the presence of a new electronic component (e.g., 200) is detected, before electronic component (e.g., 200) has been enabled to draw 48 v DC power.

In redundancy level N, the power tally is less than the power of one power supply (e.g., 130) and greater than zero. For example, if the power supplies 116–130 each supply 600 watts, and six power supplies 116–130 are connected to the electronic device 100, the total available power is 3600 watts. If the electronic components 192 and 194 attached to the electronic device 100 require a combined total of 3100 watts, the power tally equals 3600 watts minus 3100 watts, or 500 watts. The power tally, 500 watts, is less than the power of one power supply (e.g., 130), 500 watts, and greater than zero. Therefore, the power tally is at redundancy level N. This indicates that there is sufficient power for all the electronic components 192 and 194 in the electronic device 100, but that if a power supply (e.g., 130) were removed or failed, there would not be sufficient power. Thus, if the power tally is at redundancy level N, the power monitor 104 will enable power to the electronic component (e.g., 200). The power tally is at redundancy level N in substates 2 372 and 5 380.

In redundancy level N−, the power tally is less than zero. For example, if the power supplies 116–130 each supply 600 watts, and six power supplies 116–130 are connected to the electronic device 100, the total available power is 3600 watts. If the electronic components 192 and 194 attached to the electronic device 100 require a combined total of 3900 watts, the power tally equals 3600 watts minus 3900 watts, or −300 watts. The power tally, −300 watts, is less than zero. Therefore, the power tally is at redundancy level N−. This indicates that there is not sufficient power for all the electronic components 192 and 194 in the electronic device 100. Thus, if the power tally is at redundancy level N−, the power monitor 104 will not enable power to the electronic component (e.g., 200). The power tally is at redundancy level N− in substates 3 374 and 6 382.

When the breakers (not shown) are closed in the electronic device 100, 5 v DC power begins to flow from the power block 106, powering the power monitor 104, the console 102, and the power monitor interfaces (e.g., 206 and 286) in the electronic components 192 and 194. The power block 106 begins supplying 48 v DC power to the electronic device 100 under control of the power monitor 104. The power monitor 104 receives requests to turn on the 48 v DC power either from the console 102 or by an operator turning on, or closing, the power switch (not shown).

When the breakers are closed but the power switch is open, the electronic device 100 is receiving 5 v DC but not 48 v DC, and the electronic device 100 is in state A 362. The power monitor 104, the console 102, and the power monitor interfaces (e.g., 206 and 286) in the electronic components 192 and 194 are powered and operating in state A 362, but the electronic devices 192 and 194 connected to the backplanes 146 and 150 are not powered and operating.

Once the power switch is closed, and if the power tally is at N+ or N, 48 v DC is turned on in the rack and reaches the backplanes 146 and 150. When the power monitor 104 has determined that there is enough power for the electronic components 192 and 194, the power monitor 104 enables them to draw 48 v DC power from the power block 106 through the backplanes 146 and 150, and the electronic device 100 enters state B 364. The rack, or cabinet, is powered by 48 v DC and all electronic components 192 and 194 are drawing 48 v DC power in state B 364.

If a new electronic component (e.g., 200) is then added to the electronic device 100, the electronic device 100 enters state C 366, in which 48 v DC is still turned on in the rack, but the newly added electronic component (e.g., 200) is not yet enabled to draw 48 v DC power. In state C 366, previously powered electronic components (e.g., 202, 204, 280, 282, and 284) will continue to draw 48 v DC power from the electronic device 100. Once the power monitor 104 determines that the electronic device 100 has sufficient power for the newly added electronic component (e.g., 200) as well as the previously powered electronic components 192 and 194, the power monitor 104 enables the newly added electronic component (e.g., 200) to draw 48 v DC power and the electronic device 100 returns to state B 364, in which all electronic components 192 and 194 are fully powered.

Note that on-line addition of electronic components 192 and 194 is only enabled in a region 384 including states B 364 and C 366 in substates 1 370 and 2 372. This on-line addition region 384 includes only the states in which the rack is powered by 48 v DC, the power tally is valid, and the power redundancy level is at N+ or N. Electronic components 192 and 194 may be added to the electronic device 100 in other states outside the on-line addition region 384, but the power monitor 104 will not enable the newly added electronic component (e.g., 200) to draw 48 v DC power until the electronic device 100 has entered a state in the on-line addition region 384.

A cabinet powered region 386 on the state diagram 360, in which the 48 v DC is switched on, includes all substates 1–6 370–382 of state B 364 and state C 366. In the cabinet powered region 386, at least some of the electronic components 192 and 194, are enabled to draw 48 v DC power.

The state diagram 360, having been described in general, will now be described in more detail, including the individual states and state transitions. The individual states will be described in left to right, top to bottom order as they appear in the state diagram 360, rather than by trying to follow the order of state transitions through the state diagram 360. Several examples of typical paths through the state diagram 360 will be given following the description of the individual states.

In state A1 390, the 5 v DC power is on but 48 v DC power is off. The power monitor 104 has detected the presence of the installed electrical components 192 and 194 through the present electrical conductors 244, 246, 250, 324, 326, and 330. The power monitor 104 has requested and received the power requirements of each electrical component 192 and 194 from the power monitor interfaces 206, 210, 212, 286, 290, and 292 over the USB bus 252, 254, 256, 332, 334, and 336. The power tally is therefore valid, since all power requirements are known.

The power monitor 104 has also calculated the total available power from the power block 106. This is calculated by adding the power available from each power supply 116–130 in the power block 106. The available power from each power supply 116–130 is obtained by reading an identification register in each power supply 116–130, and looking up the power rating for the given type of power supply in the firmware. The firmware also reads a status register on each power supply 116–130, and excludes any power supplies which indicate a fault from the calculation of the total available power.

The power monitor 104 has then calculated the power tally by subtracting the sum of the power requirements from the electrical components 192 and 194 from the total available power, with the resulting power redundancy level being N+, as described above. The only transition 392 out of state A1 390 leads to state B1 394, triggered by the power switch closing to request that 48 v DC be turned on in the rack, or by the power on command from the console 102.

In state A2 396, the 5 v DC power is on but 48 v DC power is off. The power monitor 104 has received the power requirements of each electrical component 192 and 194 as described above, so the power tally is valid. The power redundancy level is calculated as described above, resulting in a power redundancy level of N. The only transition 400 leads to state B2 402, triggered by the power switch closing to request that 48 v DC be turned on in the rack.

In state A3 404, the 5 v DC power is on but 48 v DC power is off, and the power tally is valid. However, the power redundancy level is at N–, meaning that there is not sufficient power capacity in the electronic device 100 for the connected electronic components 192 and 194. Therefore, an attempted transition 406, triggered by the power switch closing to request that 48 v DC be turned on in the rack, leads back to state A3 404. The only way out of state A3 404 is by increasing the power capacity of the electronic device 100 or by reducing the power requirements by removing one or more electronic components 192 and 194.

In state A4 410, the 5 v DC power is on but 48 v DC power is off. The power monitor 104 has not received the power requirements of each electrical component 192 and 194, most likely due to the USB bus being initialized by the console 102, or a malfunctioning electronic component (e.g., 200) which does not respond to power requirement requests. The power tally is therefore invalid. The power redundancy level is calculated as described above, based upon the power requirements of the electronic device 100 the last time it was powered up, resulting in a power redundancy level of N+. The only transition 412 out of state A4 410 leads to state B4 414, triggered by the power switch closing to request that 48 v DC be turned on in the rack. The power monitor 104 enables the electronic components 192 and 194 to draw 48 v DC power, even though the power tally is invalid, because it assumes the power redundancy level has not changed from N+ as it was the last time the electronic device 100 was powered. This ensures that the electronic device 100 will operate even if the console 102 is not working and has not initialized the USB bus. Note that this does risk insufficient power in the electronic device 100 if the power requirements or power capacity has been changed since the last time the electronic device 100 was powered.

In state A5 416, the 5 v DC power is on but 48 v DC power is off. The power tally is invalid as described above with respect to state A4 410. The power redundancy level the last time the electronic device 100 was powered was N. Therefore, the power monitor 104 will power the electronic device 100 as described above with respect to state A4 410. The only transition 420 out of state A5 416 leads to state B5 422, triggered by the power switch closing to request that 48 v DC be turned on in the rack.

In state A6 424, the 5 v DC power is on but 48 v DC power is off, and the power tally is invalid as described above with respect to state A4 410. However, the power redundancy level the last time the electronic device 100 was powered was N–, meaning that there was not sufficient power capacity in the electronic device 100 for the connected electronic components 192 and 194. Therefore, an attempted transition 426, triggered by the power switch closing to request that 48 v DC be turned on in the rack, leads back to state A6 424. The only way out of state A6 424 is by providing a valid power tally in which the power redundancy level is N+ or N.

In state B1 394, the cabinet is fully powered, meaning that the power monitor 104 has enabled the electronic components 192 and 194 to draw 48 v DC power, as described above. State B1 394 is entered from state A1 390 as described above, or from state C1 430 by transition 432, as will be described below. The power tally is valid and the power redundancy level is N+. The only transition 434 out of state B1 394 leads to state C4 436, triggered by the addition of a new electronic component (e.g., 200). As a new electronic component (e.g., 200) is added, the power monitor 104 detects its presence on a present electrical conductor 244, 246, 250, 324, 326, or 330, triggering the state change.

In state B2 402, the cabinet is fully powered, the power tally is valid and the power redundancy level is N. State B2 402 is entered from state A2 396 as described above, or from state C2 440 by transition 442, as will be described below. The only transition 444 out of state B2 402 leads to state C5 446, triggered by the addition of a new electronic component (e.g., 200).

In state B3 450, the cabinet is fully powered, the power tally is valid, but the power redundancy level is N–. State B3 450 is not entered by a state transition triggered by the addition or removal of an electronic component 192 and 194, since the power monitor 104 would not enable an electronic component (e.g., 200) to draw 48 v DC power if the power redundancy level were N–. Rather, state B3 450 is entered by a state transition (not shown) triggered by changes in the power capacity of the electronic device 100. Specifically, a power supply (e.g., 130) was removed from the power block 106 or has reported a fault in the status register, thus its available power has been removed from the total power capacity of the electronic device 100. Other state transitions (not shown) may be triggered in similar changes in the total power capacity of the electronic device 100. The only transition 452 out of state B3 450 leads to state C6 454, triggered by the addition of a new electronic component (e.g., 200), or by adding or removing a power supply (e.g., 130).

In state B4 414, the cabinet is fully powered, the power tally is invalid and the power redundancy level is N+. State B4 414 is entered from state A4 410 as described above. The only transition 456 out of state B4 414 leads to state C4 436, triggered by the addition of a new electronic component (e.g., 200).

In state B5 422, the cabinet is fully powered, the power tally is invalid and the power redundancy level is N. State B5

422 is entered from state A5 416 as described above. The only transition 460 out of state B5 422 leads to state C5 446, triggered by the addition of a new electronic component (e.g., 200). Note that other transitions, not shown on the state diagram 360, are possible between substates 370–382 in a given state 362, 364, or 366. For example, if the USB bus begins to work and the power tally becomes valid, state B5 422 may transition to another substate in major state B 364, such as state B2 402.

In state B6 464, the cabinet is fully powered, the power tally is invalid and the power redundancy level is N−. State B6 464 is not entered by a state transition triggered by the addition or removal of an electronic component 192 and 194, since the power monitor 104 would not enable an electronic component (e.g., 200) to draw 48 v DC power if the power redundancy level were N−. Rather, state B6 464 is entered by a state transition (not shown) triggered by changes in the power capacity of the electronic device 100. The only transition 464 out of state B6 464 leads to state C6 454, triggered by the addition of a new electronic component (e.g., 200).

In state C1 430, the cabinet is partially powered, meaning that at least one electronic component 192 and 194 has not been enabled to draw 48 v DC power by the power monitor 104. The power tally is valid, and the power redundancy level is N+. State C1 430 is entered from state C4 436 by transition 466 as will be described below. The only transition 432 out of state C1 430 leads to state B1 394, triggered when the power monitor 104 determines that there is sufficient power capacity to enable the last added electronic component (e.g., 200) to draw 48 v DC power. This determination is made because state C1 430 is at power redundancy level N+.

In state C2 440, the cabinet is partially powered, the power tally is valid, and the power redundancy level is N. State C2 440 is entered from state C4 436 by transition 470, or from state C5 446 by transition 472, as will be described below. The only transition 442 out of state C2 440 leads to state B2 402, triggered when the power monitor 104 determines that there is sufficient power capacity to enable the last added electronic component (e.g., 200) to draw 48 v DC power. This determination is made because state C2 440 is at power redundancy level N.

In state C3 474, the cabinet is partially powered, and the power tally is valid, but the power redundancy level is N−. State C3 474 is entered from state C5 446 by transition 476, or from state C6 454 by transition 480, as will be described below. The only transition 482 out of state C3 474 leads to back to state C3 474, triggered by the attempt to power the last added electronic component (e.g., 200) to draw 48 v DC power. However, since state C3 474 is at power redundancy level N−, there is insufficient power for the last added electronic component (e.g., 200). Therefore, the only way out of state C3 474 is by adding power capacity or lowering the power requirements.

In state C4 436, the cabinet is partially powered, the power tally is invalid, and the power redundancy level is N+. State C4 436 is entered from state B1 394 by transition 434, or from state B4 414 by transition 456, as described above. The first transition 484 out of state C4 436 leads back to state C4 436, triggered by the attempt to power the last added electronic component (e.g., 200) to draw 48 v DC power, where the last added electronic component (e.g., 200) was added after the cabinet was powered. The power monitor 104 will not enable an electronic component (e.g., 200) to draw 48 v DC power when the power tally is invalid and the electronic component (e.g., 200) was added after the cabinet was powered. The second transition 470 out of state C4 436 leads to state C2 440, triggered by the newly added electronic component (e.g., 200) reporting its power requirements and causing the power tally to become valid, resulting in a power redundancy level of N. The third transition 466 out of state C4 436 leads to state C1 430, triggered by the newly added electronic component (e.g., 200) reporting its power requirements and causing the power tally to become valid, resulting in a power redundancy level of N+.

In state C5 446, the cabinet is partially powered, the power tally is invalid, and the power redundancy level is N. State C5 446 is entered from state B2 402 by transition 444, or from state B5 422 by transition 460, as described above. The first transition 486 out of state C5 446 leads back to state C5 446, triggered by the attempt to power the last added electronic component (e.g., 200) to draw 48 v DC power, where the last added electronic component (e.g., 200) was added after the cabinet was powered. The second transition 476 out of state C5 446 leads to state C3 474, triggered by the newly added electronic component (e.g., 200) reporting its power requirements and causing the power tally to become valid, resulting in a power redundancy level of N−. The third transition 472 out of state C5 446 leads to state C2 440, triggered by the newly added electronic component (e.g., 200) reporting its power requirements and causing the power tally to become valid, resulting in a power redundancy level of N.

Finally, in state C6 454, the cabinet is partially powered, the power tally is invalid, and the power redundancy level is N−. State C6 454 is entered from state B3 450 by transition 452, or from state B6 462 by transition 464, as described above. The first transition 490 out of state C6 454 leads back to state C6 454, triggered by the attempt to power the last added electronic component (e.g., 200) to draw 48 v DC power, where the last added electronic component (e.g., 200) was added after the cabinet was powered. The second transition 480 out of state C6 454 leads to state C3 474, triggered by the newly added electronic component (e.g., 200) reporting its power requirements and causing the power tally to become valid, resulting in a power redundancy level of N−.

Several examples of typical paths through the state diagram 360 will be now given. The first typical path begins at state A2 396, in which 5 v DC power is on, the power tally is valid and the power redundancy level is N. The power switch is closed, supplying 48 v DC power to the cabinet. The state of the electronic device 100 transitions 400 to state B2 402, in which the power tally is valid, the power redundancy level is N, and all attached electronic components 192 and 194 have been enabled to draw 48 v DC power by the power monitor 104. If an electronic component 200 is then connected to the processor backplane 146, the power monitor 104 detects it and the state transitions 444 to state C5 446, in which all previously connected electronic components 192 and 194 remain enabled to draw 48 v DC power, but the newly connected electronic component 200 has not yet been enabled to draw 48 v DC power. The power tally is invalid, because the power monitor 104 has not received the power requirements from the newly added electronic component 200, and the power redundancy level remains at N. Once the power monitor 104 receives the power requirements from the newly added electronic component 200, and if there is still sufficient power capacity for the newly added electronic component 200, the electronic device 100 transitions 472 to state C2 440. In state C2 440, the power tally is valid and the power redundancy level is N. The power monitor 104 then enables the newly added electronic component 200 to draw 48 v DC power from the electronic device 100, transitioning 442 back to state B2 402.

Another typical path through the state diagram 360 begins at state A4 410, in which the power tally is invalid and the power redundancy level is N+. Even though the power monitor 104 has not received the power requirements for the attached electronic components 192 and 194, the power monitor 104 turns on 48 v DC power to the cabinet, because the power redundancy level was N+ the last time the electronic device 100 was powered. Thus, the electronic device 100 transitions 412 to state B4 414, in which the power tally is still invalid and the power redundancy level is N+. The power monitor 104 enables all the attached electronic components 192 and 194 to draw 48 v DC power from the electronic device 100. If an electronic component 280 is then connected to the I/O backplane 150, the electronic device 100 transitions 456 to state C4 436, in which the power tally is invalid, the power redundancy level is N+, the previously attached electronic components 192 and 194 remain enabled to draw 48 v DC power, but the newly connected electronic component 280 is not enabled to draw 48 v DC power. If the USB bus is still down, or the newly connected electronic component 280 does not report its power requirements, the electronic device 100 may loop in transition 484, remaining at state C4 436. Once the newly connected electronic component 280 reports its power requirements, the electronic device 100 transitions to a new state. If the power redundancy level with the newly connected electronic component 280 will be N, the electronic device 100 transitions 470 to state C2 440, in which the power tally is valid and the power redundancy level is N. The power monitor 104 then enables the newly connected electronic component 280 to draw 48 v DC power, transitioning 442 to state B2 402.

Note that substate transitions are possible within a major state (e.g., state C 366). For example, if two electronic components (e.g., 200 and 202) are added at the same time, the electronic device 100 may follow the state path B1 394, C4 436, C1 430, C4 436, C1 430, to B1 394, over transitions not shown in the state diagram 360.

Also, the power tally always becomes invalid when an electronic component (e.g., 200) is added to the electronic device 100 when the cabinet is powered (region 386). This is because the power monitor 104 senses the presence of the electronic component 200 before it receives the power requirements from the electronic component 200.

Figure 3:
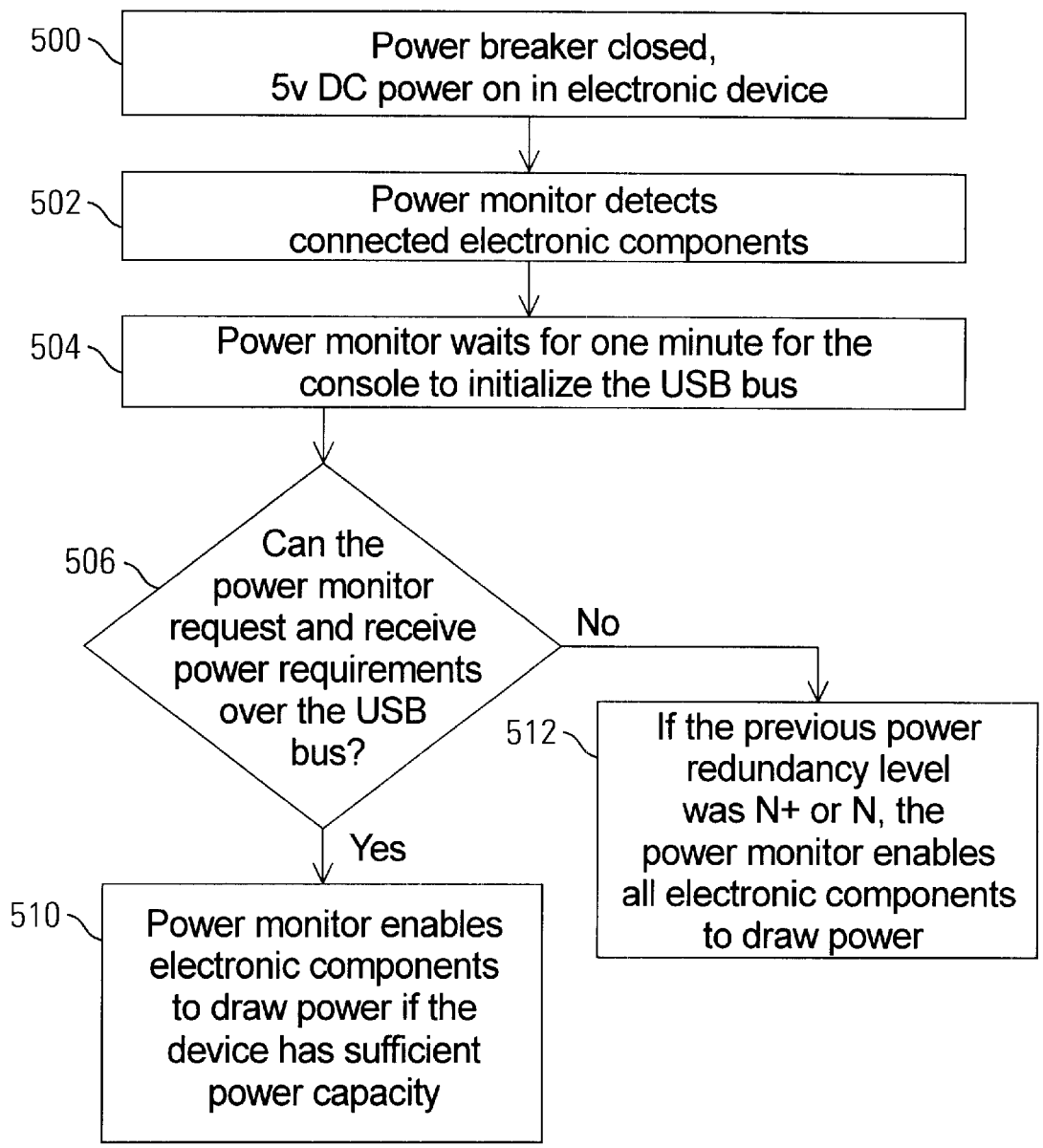
FIG. 3 is a flow chart illustrating the power up sequence in the power management system of FIG. 1.

Referring now to FIG. 3, a summary of the power on procedure will be given. The power breaker is first closed 500, providing 5 v DC power to the electronic device 100. The power monitor 104 then detects 502 the presence of the electronic components 192 and 194 connected to the electronic device 100. The power monitor 104 uses a timer to wait for one minute for the console 102 to initialize the USB bus in the electronic device 100. The power monitor 104 determines 506 whether it can request and receive the power requirements from the electronic components 192 and 194. If the power monitor 104 receives the power requirements, it enables 510 the electronic components 192 and 194 to draw 48 v DC power if the electronic device 100 has sufficient power capacity to meet the power requirements. If the power monitor 104 does not receive the power requirements, it enables 510 the electronic components 192 and 194 to draw 48 v DC power if the electronic device 100 had sufficient power capacity to meet the power requirements the last time the electronic device 100 was powered.

Note that if the power tally is invalid, the power monitor 104 assumes that it is unaware of the power requirements of at least one electronic component (e.g., 200), and that the USB bus is at best only partially functional. In the event that the USB is not fully functional, the power monitor 104 does not support configuration changes, including the addition of an electronic component (e.g., 200). The power monitor 104 is designed to protect against single, individual faults. If the USB is inactive, and the configuration changes, two faults have occurred in the electronic device 100 and the power monitor 104 may enable power draw in the electronic device 100 exceeding the capacity of the power block 106.

In an alternative embodiment, the electronic device 100 does not have present signals from the electronic components 192 and 194. In this embodiment the power monitor 104 detects the presence of the electronic components 192 and 194 over the USB bus when they automatically send power requirement messages to the power monitor 104. This embodiment requires that the USB bus be operating at all times to detect the presence of the electronic components 192 and 194.

In another alternative embodiment, the elements of the electronic device 100 are not mounted together in a rack having backplanes 146 and 150, but are electrically connected in another fashion. For example, the elements of the electronic device 100 may be housed in individual cases with electrical cables running between them.

In another alternative embodiment, the power monitor 104 performs the power tally and power redundancy calculations but does not enable a newly added electronic component (e.g., 200) to draw 48 v DC power until it receives a command from the console 102 to do so. For example, transition 432 between state C1 430 and state B1 394 would be triggered not only by the power monitor's determination that there is sufficient power capacity, but by a command from the console 102 to enable the power draw. The power monitor 104 would first signal the console 102 that the newly added electronic component (e.g., 200) was ready to be enabled to draw power. The power monitor 104 would then wait for the console 102 to command it to enable the power draw.

The power management system may be applied to any electronic device needing high availability and high reliability in the power subsystem, such as a complex computer system. The electronic device may encompass multiple power domains, such as if the device included multiple racks, each with their own power supplies and power monitors. The electronic device features a scalable number of hot-swappable, possibly redundant, power supplies and a scalable number of hot swappable, individually powerable devices, such as computing or I/O components.

Figure 4:
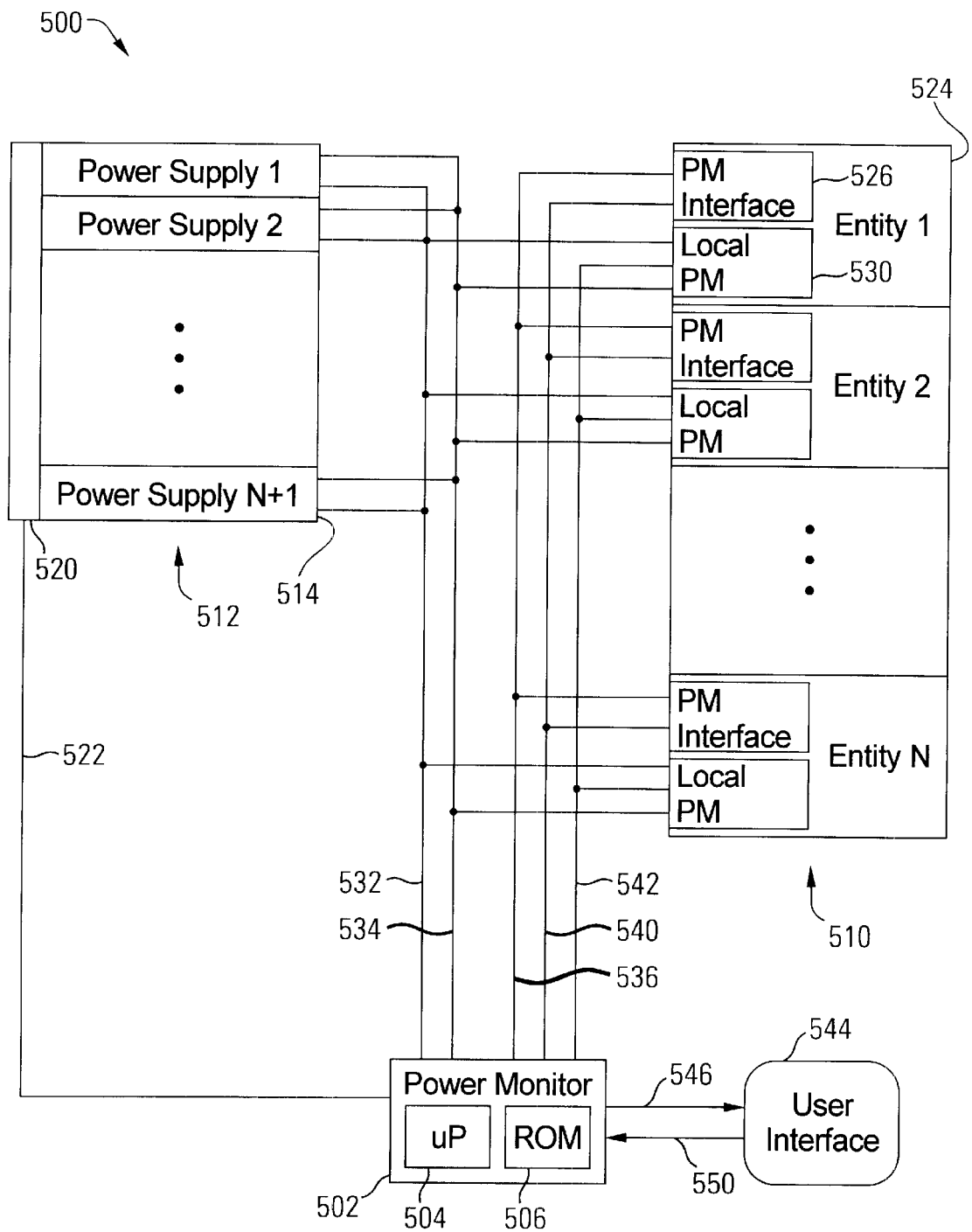
FIG. 4 is a block diagram of an alternative embodiment of a power management system.

For example, referring now to FIG. 4, the hardware of a simpler electronic device 500 with a power management system will be described. The electronic device 500 comprises a power monitor 502 having a microprocessor 504 and a ROM 506. A set of N individually powerable and hot-swappable entities 510 are electrically connected to power monitor 502. A set of N+1 hot-swappable power supplies 512 provide 5 v and 48 v power in the electronic device 500. The extra power supply 514 provides power redundancy in the event that another power supply (e.g., 516) fails. Note that the entities 510 and the power supplies 512 may or may not be collocated in a rack.

The power supplies 512 communicate with the power monitor 502 through a power supply power monitor interface 520 across any suitable transceiver 522. For example, the power supply power monitor interface 520 may transmit to the power monitor 502 N+1 present signals and N+1 status conditions, one for each power supply (e.g., 516). The power supply power monitor interface 520 may receive from the power monitor 502 a 48 v enable signal, allowing the power monitor 502 to turn the 48 v supply on and off in the electronic device 500.

Each individually powerable and hot-swappable entity (e.g., 524) includes a power monitor interface 526 and a local power monitor 530. The power monitor interfaces (e.g., 526) communicate with the power monitor 502 to indicate the presence and the power requirement of the entity (e.g., 524). The local power monitor 530 receives 5 v and 48 v power from the power supplies 512 and receives a 48 v enable signal from the power monitor 502. The local power monitor 530 also switches 48 v power use on or off in the entity (e.g., 524) according to the enable signal from the power monitor 502, and converts or regulates the 48 v to other voltages required by the entity (e.g., 524).

A 5 v power rail 532 in the electronic device 500 is connected to the 5 v power output of each power supply (e.g., 516), to the local power monitor (e.g., 530) in each entity (e.g., 524), and to the power monitor 502. A 48 v power rail 534 in the electronic device 500 is connected to the 48 v power output of each power supply (e.g., 516), to the local power monitor (e.g., 530) in each entity (e.g., 524), and to the power monitor 502. A data transfer connection 536 is connected to the power monitor interface (e.g., 526) in each entity (e.g., 524), and to the power monitor 502, across which power requirements for each entity (e.g., 526) are transmitted. A present bus 540 connects each power monitor interface (e.g., 526) in the entities 510 to the power monitor 502. The present bus 540 may comprise individual electrical transceivers or any suitable bus. An enable bus 542 connects each local power monitor (e.g., 530) in the entities 510 to the power monitor 502. The enable bus 542 may comprise individual electrical transceivers or any suitable bus.

The power monitor 502 may also communicate with an optional user interface 544 to send status information 546 and receive commands 550.

While illustrative and presently preferred embodiments of the invention have been described in detail herein, it is to be understood that the inventive concepts may be otherwise variously embodied and employed, and that the appended claims are intended to be construed to include such variations, except as limited by the prior art.

What is claimed is:

1. A method of managing power in an electronic device having at least one connectable component, comprising:
   determining a total power requirement for said at least one connectable component, wherein said at least one connectable component is electrically connected to said electronic device;
   determining an available power level for a power supply connected to said electronic device by determining an available power level for each of a plurality of electrically connected power supply modules and summing them to produce said available power level for said power supply;
   comparing said total power requirement with said available power level; and
   enabling said at least one connectable component to draw power from said power supply if said total power requirement is not greater than said available power level.

2. The method of claim 1, wherein determining said total power requirement for said at least one connectable component comprises reading at least one power requirement for each of said at least one connectable component, and summing said at least one power requirement to produce said total power requirement.

3. The method of claim 1, further comprising not enabling said at least one connectable component to draw power from said power supply if said total power requirement is greater than said available power level.

4. The method of claim 1, wherein determining said available power level for said power supply comprises reading said available power level from said power supply across an electrical connection.

5. The method of claim 1, wherein determining said available power level for said power supply comprises detecting a type of said power supply and determining said available power level based upon said type of said power supply.

6. The method of claim 1, wherein determining said total power requirement for said at least one connectable component comprises a power monitor for said electronic device requesting at least one power requirement from said at least one connectable component over an electrical bus in said electronic device, and receiving said at least one power requirement from said at least one connectable component over said electrical bus.

7. The method of claim 1, wherein determining an available power level for said power supply connected to said electronic device comprises:
   determining a total power capacity for said power supply;
   determining an allocated power level being drawn from said power supply by at least one connectable component previously connected to said electronic device; and
   subtracting said allocated power level from said total power capacity to form said available power level for said power supply.

8. The method of claim 1, further comprising detecting that said at least one connectable component is electrically connected to said electronic device before reading said at least one power requirement from said at least one connectable component.

9. The method of claim 3, further comprising indicating a power fault if said total power requirement is greater than said available power level.

10. The method of claim 7, wherein said allocated power level being drawn by said at least one previously connected connectable component remains unchanged when enabling said at least one connectable component to draw power from said power supply.

11. A method of managing power in an electronic device having at least one connectable component, comprising:
   determining a total power requirement for said at least one connectable component, wherein said at least one connectable component is electrically connected to said electronic device;
   determining an available power level for a power supply connected to said electronic device by:
      determining an available power level for each of a plurality of electrically connected power supply modules and summing them to produce said available power level for said power supply; and
      detecting faulty power supply modules among said plurality of electrically connected power supply modules and subtracting said available power levels for said faulty power supply modules from said available power level for said power supply;
   comparing said total power requirement with said available power level; and enabling said at least one connectable component to draw power from said power supply if said total power requirement is not greater than said available power level.

12. A method of managing power in an electronic device having at least one connectable component, comprising:
   determining a total power requirement for said at least one connectable component, wherein said at least one connectable component is electrically connected to said electronic device;
   determining an available power level for a power supply connected to said electronic device;
   comparing said total power requirement with said available power level; and
   enabling said at least one connectable component to draw power from said power supply if said total power requirement is not greater than said available power level and if said at least one connectable component is detected as electrically connected to said electronic device and said at least one power requirement cannot be read from said at least one connectable component.

13. The method of claim 12, further comprising attempting to read said at least one power requirement from said at least one connectable component for a predetermined amount of time before enabling said at least one connectable component to draw power from said power supply when said at least one connectable component is detected as electrically connected to said electronic device and said at least one power requirement cannot be read from said at least one connectable component.

14. Apparatus for managing power in an electronic device, the apparatus comprising:
   a. one or more computer readable storage media; and
   b. computer readable program code stored in the one or more computer readable storage media, the computer readable code comprising:
      i. code for reading at least one power requirement from each of at least one electronic component operatively associated with said electronic device;
      ii. code for summing said at least one power requirement from said at least one electronic component to calculate a total power requirement for said at least one electronic component;
      iii. code for comparing said total power requirement with an available power level from at least one power supply, said at least one power supply being operatively associated with said electronic device; and
      iv. code for enabling said at least one electronic component to draw power from said at least one power supply if said total power requirement is not greater than said available power level.

15. The apparatus of claim 14, further comprising code for calculating said available power level by reading at least one power capacity from at least one power module in said power supply and summing said at least one power capacity to form said available power level.

16. The apparatus of claim 14, wherein said code for enabling said at least one electronic component to draw power from said at least one power supply comprises code for asserting a power enable electrical conductor, said power enable electrical conductor being electrically connected to said at least one electronic component.

17. The apparatus of claim 14, further comprising code for detecting a presence of said at least one electronic component, said code for detecting a presence comprising reading a status of at least one electronic component present electrical conductor, said at least one electronic component present electrical conductor being electrically connected to said at least one electronic component.

18. The apparatus of claim 17, wherein said code for enabling said at least one electronic component to draw power from said at least one power supply first detects said presence of said at least one electronic component before enabling it to draw power from said at least one power supply.

19. Apparatus for managing power in an electronic device, the apparatus comprising:
   a. one or more computer readable storage media; and
   b. computer readable program code stored in the one or more computer readable storage media, the computer readable code comprising:
      i. code for reading at least one power requirement from each of at least one electronic component operatively associated with said electronic device;
      ii. code for summing said at least one power requirement from said at least one electronic component to calculate a total power requirement for said at least one electronic component;
      iii. code for calculating an available power level by reading at least one power capacity from at least one power module in at least one power supply and summing said at least one power capacity to form said available power level, and by reading at least one status indicator on said at least one power module in said power supply to identify failing power modules among said at least one power module, said code for calculating said available power level subtracting said at least one power capacity of said failing power modules from said available power level;
      iv. code for comparing said total power requirement with said available power level from said at least one power supply, said at least one power supply being operatively associated with said electronic device; and
      v. code for enabling said at least one electronic component to draw power from said at least one power supply if said total power requirement is not greater than said available power level.

20. A power management system for an electronic device, said power management system comprising:
   a. at least one power supply having an available power capacity;
   b. a power monitor comprising:
      i. at least one first receiver;
      ii. at least one first transmitter having at least a first operative state and a second operative state;
      iii. at least one detector;
   c. at least one electronic component associated with said electronic device, said at least one electronic component being electrically connected to said at least one power supply, said at least one electronic component having a power requirement, said at least one electronic component comprising:
      i. at least one second transmitter electrically connected to said at least one power monitor first receiver;
      ii. at least one second receiver electrically connected to said at least one power monitor first transmitter;
      iii. at least one indicator;
   d. wherein said power management system further comprises at least:

i. a first operating state comprising:
  (1) said at least one electronic component drawing power from said at least one power supply;
  (2) said at least one power monitor first receiver having received said power requirement from said at least one electronic component at least one second transmitter wherein a sum of said power requirement is not greater than a sum of said at least one power supply available power capacity;
  (3) said at least one power monitor at least one first transmitter being in said first operative state; and
  (4) said electronic component at least one indicator being electrically connected to said power monitor at least one detector;
ii. a second operating state comprising:
  (1) said at least one electronic component not drawing power from said at least one power supply;
  (2) said at least one power monitor first receiver having received said power requirement from said at least one electronic component at least one second transmitter wherein said sum of said power requirement is greater than said sum of said at least one power supply available power capacity;
  (3) said at least one power monitor at least one first transmitter being in said second operative state; and
  (4) said electronic component at least one indicator being electrically connected to said power monitor at least one detector; and
iii. a third operating state comprising:
  (1) said at least one electronic component drawing power from said at least one power supply;
  (2) said electronic component at least one indicator being electrically connected to said power monitor at least one detector;
  (3) said at least one power monitor first receiver not having received said power requirement from said at least one electronic component at least one second transmitter; and
  (4) said at least one power monitor at least one first transmitter being in said first operative state.

21. The power management system of claim 20, wherein said power management system further comprises a fourth operating state comprising:
  a. said at least one electronic component not drawing power from said at least one power supply;
  b. said electronic component at least one indicator being electrically disconnected from said power monitor at least one detector; and
  c. said at least one power monitor at least one first transmitter being in said second operative state.

* * * * *